United States Patent Office

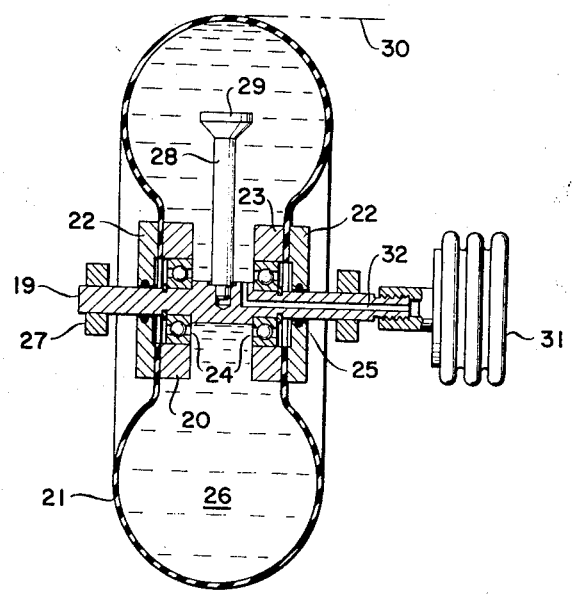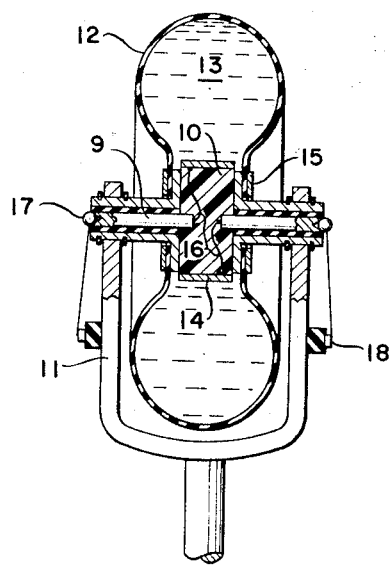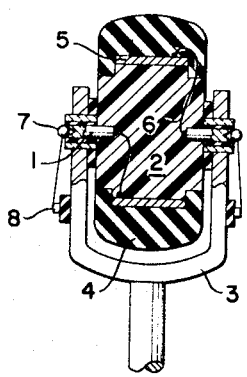

3,442,349
Patented May 6, 1969

3,442,349
ACOUSTIC PIPELINE LEAK DETECTOR
Hendrik Bosselaar, Amsterdam, Netherlands, assignor to Shell Oil Company, New York, N.Y., a corporation of Delaware
Filed Nov. 3, 1967, Ser. No. 680,539
Claims priority, application Great Britain, Jan. 16, 1967, 2,207/67
Int. Cl. G10k 10/00
U.S. Cl. 181—.5                9 Claims

ABSTRACT OF THE DISCLOSURE

An acoustic pick-up device for use with an apparatus for detecting leaks in the wall of a pipeline when the pipeline is on stream including a wheel having a resilient tire which houses a piezoelectric element for detecting vibrations; the device being transported through a pipeline with the tire in rolling contact with the interior of the pipeline. The tire may be either a solid tire of rubber-like material or a hollow tire filled with liquid. The piezoelectric element may be cylindrical so as to turn with the device or it may be attached to a fixed axle so that it remains stationary relative to the tire.

Background of the invention

The invention relates to an apparatus for the inspection of a pipeline for leaks by acoustic means and to a process for this purpose.

Inspection of a pipeline for leaks may consist of establishing the presence or the absence of leaks, of locating a leak, of determining the size of a leak or a combination thereof.

A known process for the inspection of a pipeline for leaks while that pipeline is on stream is the use of an apparatus which is fitted for observing and further processing vibrations produced by leaks and which can be transported through that pipeline with the aid of a carrier along with the flow of matter through that pipeline as disclosed in U.S. application 602,628, filed Dec. 19, 1966. Here the inspection takes place from the inside, without the pipeline being shut down. This allows frequent and inexpensive inspection. Also, inspection is possible when the pipeline is located in areas of poor accessibility or when it is buried or when it is positioned on the floor of a body of water.

Owing to the matter flowing out under the influence of pressure, a leak generates acoustic vibrations. The frequencies extend from the sonic into the ultrasonic range. The equipment that is transported through the pipeline, when passing a leak observes vibrations originating from this leak as a peak-signal. Further interpretation of this observation will only be possible if the peak-shaped signal is sufficiently strong in comparison with the background noise invariably present in a pipeline on stream. The equipment should therefore be designed so as to favor the observation of vibrations originating from a leak.

The generation of acoustic vibrations by the flow of matter through a leak channel may be explained as follows. The flow pattern of matter flowing from a leak channel may develop instabilities of a nature causing oscillations which produce acoustic vibrations. This is further promoted if the matter flowing from the channel meets an obstacle, which usually happens in the case of buried pipelines. So the vibrations are generated mainly at the outflow end of a leak channel. The pipe wall in the immediate vicinity of that leak channel may now start vibrating sympathetically and this in turn greatly contributes to the vibrations being transferred to the matter in the pipeline, provided the coefficient of transfer is sufficiently high. This condition is not always satisfied. In particular, in a pipeline employed for the transport of gas, transfer of vibrations from the pipe wall to the gas is poor. It has further been found that outflow of gas from a leak in a pipeline carrying gas proceeds at least at the velocity of sound if the pressure drop across a leak channel exceeds a minimum value. In pipelines for the transport of gas this condition is amply satisfied. Owing to this high gasflow rate in the leak channel vibrations generated in a leak channel or at the outflow end thereof cannot via the gas in that channel reach the measuring equipment in the pipeline.

In the equipment for the observation of vibrations originating from leaks in pipelines known thus far the pick-up for instance a microphone or a hydrophone, is located in the matter present in the pipeline. From the foregoing explanation it will be clear that conditions for the observation of said vibrations will then not be optimum and that sometimes vibrations cannot be observed at all.

Summary of the invention

According to the invention this situation is corrected by providing an appartaus of the type described in the aforementioned U.S. application 602,628, with a pick-up for the aforementioned vibrations which is capable of making acoustic contact with the pipe wall via a travelling wheel which can move along the inside of the pipe wall, which travelling wheel is provided with a tire with rubber-like properties.

The apparatus according to the invention ensures a good acoustic contact between the pick-up and the wall of the pipeline, and so vibrations caused by matter leaking away, even if this is a gas, can still be picked up by an apparatus located inside the pipeline. The use of a traveling wheel having a tire with rubber-like properties makes it possible to largely suppress or to eliminate disturbing noise, which might otherwise be caused by scraping or bumping, and promotes an effective transfer of vibrations from the well to the tire. The travelling wheel will as a rule be attached to the casing of the apparatus which houses a recorder as shown in U.S. application 602,628 by means of a hinged arm. A spring then enables the wheel to be forced against the inside wall of the pipeline. It is, however, also possible to use one of the wheels of the carrier for this purpose.

A suitable embodiment comprises a travelling wheel provided with a solid tire enclosing a pick-up with axially symmetrical distributed directions of sensitivity, which pick-up is capable of rotating about the axle of the wheel along with the tire; the pick-up and tire being connected with each other. When the apparatus passes a leak, vibrations in the wall of the pipeline are transferred to the rubber tire and from the tire are transferred immediately to the pick-up. The pick-up is equally sensitive in any direction perpendicular to the axis of rotation of the wheel, and so the position of the wheel does not influence the sensitivity of the pick-up.

The pick-up to be used in this arrangement may be a hollow cylinder made from material with piezoelectric properties, the cylinder being arranged coaxially with the axle of the wheel. Suitable cylinders for this purpose are those of approximately 1.5 cm. diameter and approximately 2 cm. length. Piezoelectric materials of this type, for example, lead zirconate, are available. Provision has to be made to effect electric connections between the rotating cylinder and suitable recording equipment of the type described in the aforementioned U.S. application 602,628. This can be done with known means, such as slip rings.

It is also possible to obtain a pick-up with axially symmetrical sensitivity by combining a number of small crystals into an approximately cylindrical surface of a mosaical structure. It that case each crystal has a maximum sensistivity in the direction perpendicular of the tangent plane to the cylinder at the location of that crystal.

An attractive embodiment comprises a travelling wheel provided with a hollow tire filled with liquid in which the pick-up is located. This ensures smooth travel of the wheel along the inside wall of the pipe, while at the same time the shape of the tire is adapted so that the tire closely fits the said wall, which promotes the acoustic contact with the wall. The liquid in the tire provides for the acoustic contact with the pick-up. The liquid may be glycerine, glycol, gas oil, low-viscosity lubricating oil, and the like. The tire may consist of, for instance, silicone rubber, natural rubber or synthetic rubber. The pick-up may again be a cylinder of piezo-electric material, as described hereinbefore. This cylinder may rotate along with the wheel, slip rings or similar devices being again required to effect the electric contact with the apparatus. The presence of liquid between pick-up and tire provides the additional possibility of installing a cylindrical pick-up that is stationary relative to the axle of the wheel. In this embodiment fixed electric connections to the crystal may be employed, without slip rings. However, in that case there is required a liquid-tight seal on the axle that is resistant to rotation.

In the embodiment with a liquid-filled tire a pick-up having a maximum sensitivity in one direction may be used to advantage. During rotation of the wheel relative to the pipe wall the said pick-up remains invariably at a minimum distance from the pipe wall, the direction of sensitivity being that of a radius. This pick-up may again be a flat crystal mounted in a container which is fitted to the non-rotating axle of the travelling wheel, the crystal being located in the liquid. In this case also, fixed electric connections to the crystal may be employed but, again, there is required a liquid-tight seal on the axle that is resistant to rotation. To ensure good operation of a travelling wheel with a liquid-filled tire it is desirable for the liquid inside the tire to be connected with a device which keeps that liquid at the desired pressure. Such a device may consist of a reservoir which is filled with liquid and carried along with the carrier, the liquid being kept at the desired pressure by gas pressure or mechanical pressure. The reservoir communicates with the liquid-filled chamber inside the tire via a line through the axle of the travelling wheel. Thus, it is possible for liquid that may have leaked away, for example, along the seal, to be replenished.

*Brief description of the drawings*

The invention will now be elucidated with the aid of some figures.

FIGURE 1 is a cross-sectional view of a pick-up with a travelling wheel having a solid tire according to the invention;

FIGURE 2 is a cross-sectional view of a pick-up with a travelling wheel having a hollow tire according to the invention; and, FIGURE 3 is a cross-sectional view of another embodiment of a pick-up with a hollow tire according to the invention.

*Description of the preferred embodiments*

In FIGURE 1, items 1 are the ends of the axle of a travelling wheel 2. The axle is supported by a fork 3, which is connected in a manner not further indicated to equipment for recording the vibrations and transporting the apparatus through a pipeline. The equipment may be of any suitable type, for example, it may be of the type described in U.S. application 602,628 mentioned above. The travelling wheel 2 is provided with a solid rubber tire 4. This tire contains a vibration-sensitive cylinder 5 made from material with piezoelectric properties. The cylinder is arranged coaxially with the axle of the travelling wheel. The directions of maximum sensitivity to acoustic vibrations are axially symmetrically distributed and are perpendicular to the tangent planes to the cylinder. Items 1, 2, 4 and 5 form an integrated whole and so rotate when the tire 4 rolls along the inside wall of the pipe. The cylinder 5 and the remaining equipment are connected electrically by means of wires 6, spheres 7 and terminals 8. The non-rotating spheres 7 are electrically connected to the axle ends 1, which are electrically insulated relative to each other and to the fork 3. The diameter of the wheel with the tire may lie in the range of from 2 to 10 cm. The length of the cylinder may be, for example, 2 cm.

In FIGURE 2 items 9 represent the ends of the axle of a travelling wheel 10. The axle is supported by a fork 11, which is connected to suitable recording and transporting equipment in a manner not further indicated. The travelling wheel 10 is provided with a hollow tire 12 filled with a liquid 13. A vibration-sensitive cylinder 14 is in contact with the liquid 13. The cylinder 14 has the same properties as the cylinder 5 in FIGURE 1. The tire 12 is fixed to the axle ends 9 with the strips 15. The connection is liquid-tight. Items 9, 10, 12, 14 and 15 form an integrated whole and so will rotate when the tire 12 rolls along the inside wall of the pipe. The liquid 13 will follow this movement. The cylinder 14 and the remaining equipment are electrically connected by means of lines 16, non-rotating spheres 17 and terminals 18. The axle ends are electrically insulated relative to each other and to the fork 11.

In FIGURE 3 item 19 represents the axle of a travelling wheel 20. A hollow rubber tire 21 is clamped by rings 22 and 23 and connected to a bearing 24. The seals 25 prevent leakage of the liquid 26 contained in the hollow tire 21. In this embodiment the axle 19, does not rotate. The wheel is connected to the remaining equipment by means of a fork 27 in a manner not further indicated. An arm 28 is connected to the axle 19 and carries a pick-up 29. Arm 28 and pick-up 29 are stationary relative to the tire 21 when the tire rolls along the inside of the pipe wall. The electric connections to the pick-up 29 may be fixed wires (not shown) running via the arm 28 and the axle 19 to suitable recording equipment. This is not further indicated. The pick-up 29 may be a piezoelectric crystal with a maximum sensitivity in the direction perpendicular to the crystal plane. The line 30 indicates the point of tangency where the tire 21 is in contact with the inside wall of the pipe. A bellows 31 is attached to the axle 19 and connected via a channel 32 with the space in the tire 21. Bellows 31 and channel 32 are likewise liquid-filled. Owing to the elasticity of the bellows 31 the liquid inside the tire 21 is kept at the desired pressure.

I claim as my invention:

1. In an apparatus for the detection of a leak in the wall of a pipeline by detecting the acoustic vibrations caused by said leak when the pipeline is on stream, said apparatus being provided with a vibration sensing device, said device comprising:

wheel means adapted to be transported through a pipeline;

resilient tire means carried by said wheel means and positioned in rolling contact with the interior of said pipeline; and, acoustic vibration pick-up means carried by said wheel means internally of said tire means for detecting acoustic vibrations caused by a leak in the pipeline wall.

2. An apparatus as defined in claim 1 wherein said pick-up means comprise a substantially cylindrical body having piezoelectric properties and arranged substantially coaxial with said wheel means.

3. An apparatus as defined in claim 2 wherein said tire means comprise a solid tire of rubber-like material.

4. An apparatus as defined in claim 2 wherein said tire means comprise a hollow tire of rubber-like material, said tire being filled with a liquid.

5. An apparatus as defined in claim 1 wherein said wheel means is rotatably mounted to non-rotating axle means and wherein said pick-up means are attached to said axle means.

6. An apparatus as defined in claim 5 wherein said tire means comprise a hollow tire of rubber-like material, said tire being filled with a liquid.

7. An apparatus as defined in claim 6 including:
arm means attached to said axle means and disposed internally of said tire;
said pick-up means carried by one end of said arm and the other end of said arm being attached to said axle means at a right angle;
whereby said pick-up means remains in the same position relative to said pipeline as said tire rolls along the interior of the pipeline.

8. An apparatus as defined in claim 7 wherein said pick-up means includes a material having piezoelectric properties and further wherein said arm means is positioned along a line extending between said axle means and the point of tangency of the tire to the interior of the pipeline.

9. An apparatus as defined in claim 8 including:
bellows means attached to said axle means; and,
passage means formed in said axle and extending between the interior of said bellows means and the interior of said tire to provide liquid communication therebetween.

References Cited

UNITED STATES PATENTS

| | | |
|---|---|---|
| 3,191,713 | 6/1965 | Green. |
| 3,264,864 | 8/1966 | Reid et al. |
| 3,301,345 | 1/1967 | Carder. |

BENJAMIN A. BORCHELT, *Primary Examiner.*

GERALD H. GLANZMAN, *Assistant Examiner.*